United States Patent
Lagudu et al.

(10) Patent No.: US 11,769,041 B2
(45) Date of Patent: Sep. 26, 2023

(54) LOW LATENCY LONG SHORT-TERM MEMORY INFERENCE WITH SEQUENCE INTERLEAVING

(71) Applicants: Advanced Micro Devices, Inc., Santa Clara, CA (US); ATI Technologies ULC, Markham (CA)

(72) Inventors: Sateesh Lagudu, Hyderabad (IN); Lei Zhang, Richmond Hill (CA); Allen H. Rush, Danville, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 1244 days.

(21) Appl. No.: 16/177,218

(22) Filed: Oct. 31, 2018

(65) Prior Publication Data
US 2020/0134432 A1    Apr. 30, 2020

(51) Int. Cl.
| G06N 3/063 | (2023.01) |
| G06F 7/544 | (2006.01) |
| G06F 17/16 | (2006.01) |
| G06N 20/00 | (2019.01) |

(52) U.S. Cl.
CPC ........... *G06N 3/063* (2013.01); *G06F 7/5443* (2013.01); *G06F 17/16* (2013.01); *G06N 20/00* (2019.01)

(58) Field of Classification Search
CPC ........ G06N 3/063; G06F 7/5443; G06F 17/16
See application file for complete search history.

(56) References Cited

U.S. PATENT DOCUMENTS

| 4,873,630 A | 10/1989 | Rusterholz et al. |
| 5,657,420 A | 8/1997 | Jacobs et al. |
| 6,067,287 A | 5/2000 | Chung-Ju et al. |
| (Continued) | | |

FOREIGN PATENT DOCUMENTS

| EP | 3098762 A1 | 11/2016 |
| JP | 2014203135 A | 10/2014 |
| (Continued) | | |

OTHER PUBLICATIONS

Non-Final Office Action in U.S. Appl. No. 15/812,336, dated Oct. 14, 2020, 20 pages.
(Continued)

*Primary Examiner* — Michael D. Yaary
(74) *Attorney, Agent, or Firm* — KOWERT HOOD MUNYON RANKIN AND GOETZEL PC; Rory D. Rankin

(57) ABSTRACT

Systems, apparatuses, and methods for implementing a low latency long short-term memory (LSTM) machine learning engine using sequence interleaving techniques are disclosed. A computing system includes at least a host processing unit, a machine learning engine, and a memory. The host processing unit detects a plurality of sequences which will be processed by the machine learning engine. The host processing unit interleaves the sequences into data blocks and stores the data blocks in the memory. When the machine learning engine receives a given data block, the machine learning engine performs, in parallel, a plurality of matrix multiplication operations on the plurality of sequences in the given data block and a plurality of coefficients. Then, the outputs of the matrix multiplication operations are coupled to one or more LSTM layers.

20 Claims, 9 Drawing Sheets

(56) References Cited

U.S. PATENT DOCUMENTS

| | | | |
|---|---|---|---|
| 8,131,660 | B2 | 3/2012 | Davis et al. |
| 8,369,595 | B1 | 2/2013 | Derakhshani et al. |
| 9,319,137 | B2 | 4/2016 | Zhuge et al. |
| 9,430,735 | B1 | 8/2016 | Vali et al. |
| 10,078,794 | B2 | 9/2018 | Pierce et al. |
| 10,740,674 | B2 | 8/2020 | Ambrose et al. |
| 10,776,684 | B1 | 9/2020 | Agarwal et al. |
| 2002/0152441 | A1 | 10/2002 | Senda et al. |
| 2006/0031652 | A1 | 2/2006 | Richter et al. |
| 2007/0030926 | A1 | 2/2007 | Brown et al. |
| 2011/0078342 | A1 | 3/2011 | Siddabathuni et al. |
| 2011/0296212 | A1 | 12/2011 | Elnozahy et al. |
| 2015/0178246 | A1 | 6/2015 | Herrero Abellanas et al. |
| 2015/0242322 | A1 | 8/2015 | Vajapeyam |
| 2015/0358755 | A1 | 12/2015 | Luo et al. |
| 2016/0062294 | A1 | 3/2016 | Murashima |
| 2016/0179434 | A1 | 6/2016 | Herrero Abellanas et al. |
| 2016/0259994 | A1 | 9/2016 | Ravindran et al. |
| 2016/0350645 | A1* | 12/2016 | Brothers .................. G06N 3/04 |
| 2016/0379109 | A1 | 12/2016 | Chung et al. |
| 2017/0124451 | A1 | 5/2017 | Barham et al. |
| 2017/0286864 | A1 | 10/2017 | Fiedel et al. |
| 2017/0316312 | A1 | 11/2017 | Goyal et al. |
| 2017/0344882 | A1 | 11/2017 | Ambrose et al. |
| 2018/0032859 | A1 | 2/2018 | Park et al. |
| 2018/0032867 | A1 | 2/2018 | Son et al. |
| 2018/0046900 | A1 | 2/2018 | Dally et al. |
| 2018/0082212 | A1 | 3/2018 | Faivishevsky et al. |
| 2018/0089087 | A1 | 3/2018 | Chang et al. |
| 2018/0096226 | A1 | 4/2018 | Miabadi et al. |
| 2018/0174036 | A1* | 6/2018 | Han ...................... G06N 3/063 |
| 2018/0189641 | A1 | 7/2018 | Boesch et al. |
| 2018/0218303 | A1 | 8/2018 | Cole et al. |
| 2018/0262291 | A1 | 9/2018 | Doster et al. |
| 2018/0365558 | A1 | 12/2018 | Sekiyama et al. |
| 2019/0026237 | A1 | 1/2019 | Talpes et al. |
| 2019/0028752 | A1 | 1/2019 | Zhang et al. |
| 2019/0205745 | A1 | 7/2019 | Sridharan et al. |
| 2019/0266015 | A1 | 8/2019 | Chandra et al. |
| 2019/0324755 | A1 | 10/2019 | Herr et al. |
| 2019/0324759 | A1 | 10/2019 | Yang et al. |
| 2019/0325296 | A1* | 10/2019 | Powers ................. G06N 3/0454 |
| 2020/0258223 | A1 | 8/2020 | Yip et al. |

FOREIGN PATENT DOCUMENTS

| | | | |
|---|---|---|---|
| JP | 2016033806 | A | 3/2016 |
| JP | 2017151604 | A | 8/2017 |
| WO | 2017003887 | A1 | 1/2017 |

OTHER PUBLICATIONS

Notice of Allowance in U.S. Appl. No. 16/234,956, dated May 5, 2020, 10 pages.

Non-Final Office Action in U.S. Appl. No. 15/657,613, dated Oct. 5, 2018, 12 pages.

Lagudu et al., U.S. Appl. No. 15/812,336, entitled "Memory Bandwidth Reduction Techniques for Low Power Convolutional Neural Network Inference Applications", filed Nov. 14, 2017, 41 pages.

Zhang et al., U.S. Appl. No. 16/117,302, entitled "Machine Learning Inference Engine Scalability", filed Aug. 30, 2018, 32 pages.

Zhang et al., U.S. Appl. No. 16/234,956, entitled "Tiling Format for Convolutional Neural Networks", filed Dec. 28, 2018, 42 pages.

Wang et al., U.S. Appl. No. 16/367,093, entitled "Auto Generation and Tuning Tool for Convolution Kernels", filed Mar. 27, 2019, 32 pages.

Final Office Action in U.S. Appl. No. 15/657,613, dated Mar. 8, 2019, 10 pages.

International Search Report and Written Opinion in International Application No. PCT/US2018/052358, dated Feb. 18, 2019, 13 pages.

Cecconi et al., "Optimal Tiling Strategy for Memory Bandwidth Reduction for CNNs", International Conference on Advanced Concepts for Intelligent Vision Systems, Sep. 18, 2017, pp. 89-100.

Fan et al., "F-C3D: FPGA-based 3-Dimensional Convolutional Neural Network", 27th International Conference on Field Programmable Logic and Applications (FPL), Sep. 4, 2017, 4 pages.

Rahman et al., "Efficient FPGA Acceleration of Convolutional Neural Networks Using Logical-3D Compute Array", Proceedings of the 2016 Conference on Design, Automation & Test in Europe, Mar. 14, 2016, pp. 1393-1398.

Non-Final Office Action in U.S. Appl. No. 16/117,302, dated Jan. 12, 2022, 66 pages.

Lin et al., "Deep Gradient Compression: Reducing the Communication Bandwidth for Distributed Training", ICLR 2018 Conference, Dec. 5, 2017, 13 pages.

Non-Final Office Action in U.S. Appl. No. 17/006,533, dated Jan. 27, 2022, 12 pages.

First Examination Report in Indian Patent Application No. 202017020013, dated Mar. 28, 2022, 7 pages.

Non-Final Office Action in U.S. Appl. No. 16/367,093, dated May 19, 2022, 15 pages.

Notice of Allowance in U.S. Appl. No. 17/006,533, dated Jul. 5, 2022, 8 pages.

Non-Final Office Action in Japanese Patent Application No. 2020-544323, dated Aug. 23, 2022, 9 pages.

Final Office Action in U.S. Appl. No. 16/117,302, dated Sep. 14, 2022, 74 pages.

Li et al., "A High Performance FPGA-Based Accelerator for Large-Scale Convolutional Neural Networks" 2016 26th International Conference on Field Programmable Logic and Applications (FPL), 2016, 9 pages.

Non-Final Office Action in U.S. Appl. No. 18/050,939, dated Mar. 29, 2023, 13 pages.

Final Office Action in U.S. Appl. No. 16/367,093, dated Dec. 16, 2022, 17 pages.

Advisory Action in U.S. Appl. No. 16/117,302, dated Feb. 28, 2023, 4 pages.

* cited by examiner

LOW LATENCY LONG SHORT-TERM MEMORY INFERENCE WITH SEQUENCE INTERLEAVING

BACKGROUND

Description of the Related Art

Long short-term memory (LSTM) networks have been widely used for speech recognition, language modeling, sentiment analysis, text prediction, and other applications. A LSTM network includes one or more LSTM layers. Each LSTM layer can include an input gate, a forget gate, a memory block, an output gate, and one or more non-linear cells. The input gate and the forget gate control the information flow into and out of the memory block. The output gate controls how much information from the memory block is passed to an output response. By algorithm, LSTM performance is limited by matrix multiplication operation throughput, coefficient read bandwidth, and data read bandwidth of a single sequence of input data. LSTM processing is composed of matrix multiplication units with a specific matrix configuration and LSTM cell processing. Because of the specific matrix configuration (i.e., one row and one column can be processed at a time), the matrix multiplication processing is implemented in an inefficient manner. This results in under-utilization of the multipliers and accumulators.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements. In this document, sequences can be alternatively referred to as batches in machine learning terminology, wherein the batches use the same set of weight coefficients for forward long short-term memory (LSTM) inference.

SUMMARY

Various systems, apparatuses, and methods for implementing a low latency long short-term memory (LSTM) machine learning engine using sequence interleaving techniques are disclosed herein. In one implementation, a computing system includes at least a host processing unit, a machine learning engine, and a memory subsystem. The host processing unit detects a plurality of sequences which will be processed by the machine learning engine. The host processing unit interleaves the sequences into data blocks and stores the data blocks in the memory. When the machine learning engine receives a given data block, the machine learning engine performs, in parallel, a plurality of matrix multiplication operations on the plurality of sequences in the given data block and a plurality of coefficients. Then, the outputs of the matrix multiplication operations are coupled to one or more LSTM layers. Any of various applications can implement the low latency sequence interleaving techniques described herein. For example, forward inference of speech modeling, image labeling, inference server, artificial intelligence gaming applications, and other applications are able to implement these techniques and achieve a factor of N speedup, wherein N is the number of sequences or batches which are interleaved.

Figure 1:
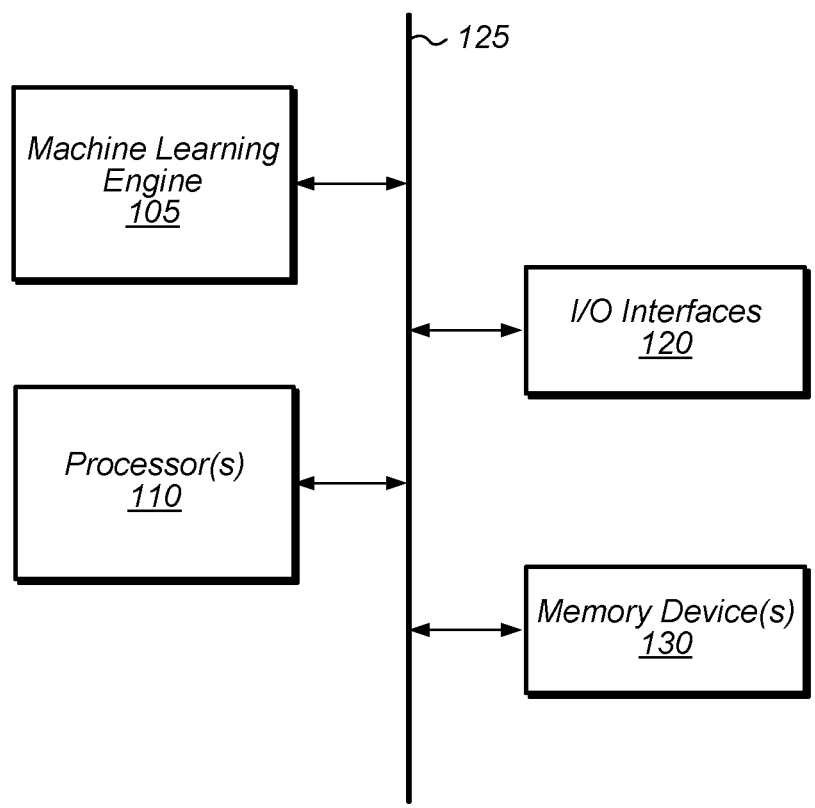
FIG. 1 is a block diagram of one implementation of a computing system.

Referring now to FIG. 1, a block diagram of one implementation of a computing system 100 is shown. In one implementation, computing system 100 includes at least machine learning engine 105, processor(s) 110, input/output (I/O) interfaces 120, bus 125, and memory device(s) 130. In other implementations, computing system 100 includes other components and/or computing system 100 is arranged differently. It is noted that machine learning engine 105 can also be referred to herein as an "inference engine". It is also noted that processor(s) 110 can also be referred to herein as "processing units".

In various implementations, machine learning engine 105 includes logic for implementing any of various machine learning algorithms or machine learning models. In one implementation, machine learning engine 105 implements one or more layers of a recurrent neural network. For example, in this implementation, machine learning engine 105 implements one or more matrix multiplication layers and one or more LSTM layers. In another implementation, machine learning engine 105 implements one or more layers of a convolutional neural network. In other implementations, machine learning engine 105 executes other types of machine learning models.

Processor 110 detects multiple separate and independent sequences in memory device(s) 130 that will be processed by machine learning engine 105. In response to detecting the separate sequences that will be processed by machine learning engine 105, processor 110 interleaves the separate sequences together into a single interleaved multi-sequence data stream. In one implementation, the samples from independent sequences (or batches) are fetched from external system memory device(s) 130 from different locations and interleaved within multi-sample words and copied into local memory (not shown) of machine learning engine 105. Then, machine learning engine 105 fetches the multi-sample words with interleaved sequences from the local memory and processes the multi-sample words much more efficiently than previously possible with conventional methods. In one implementation, processing the multi-sample words involves performing matrix multiplication on the multi-sample words with a plurality of coefficients, wherein the plurality of coefficients are stored in an N×(N+M) matrix, wherein N and M are positive integers greater than one. An example of interleaving batches within multi-sample words and copying the multi-sample words into local memory is described further below in the discussion regarding FIG. 9. It is noted that the terms "batches" and "sequences" are used interchangeably herein. As used herein, the term "batch" or "sequence" is defined as a scalar-valued or vector-valued time series of elements (i.e., samples).

In one implementation, machine learning engine 105 implements a trained neural network. For example, in this implementation, machine learning engine 105 analyzes a video frame to generate one or more label probabilities for the video frame. For example, potential use cases include at least eye tracking, object recognition, point cloud estimation, ray tracing, light field modeling, depth tracking, and others. For eye tracking use cases, probabilities generated by machine learning engine 105 are based on learned patterns, dwell, transition angles, blink, etc. In other implementations, machine learning engine 105 is customized for other types of use cases. For example, in these implementations, machine learning engine 105 is customized for speech recognition, language modeling, sentiment analysis, text prediction, and/or other applications. In further implementations, machine learning engine 105 executes other types of software models or algorithms besides machine learning models.

Processors(s) 110 are representative of any number and type of processing units (e.g., central processing unit (CPU), graphics processing unit (GPU), digital signal processor (DSP), field programmable gate array (FPGA), application specific integrated circuit (ASIC)). In one implementation, some of the processing associated with the model implemented by machine learning engine 105 is performed by processor(s) 110. Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (Fe-RAM), or others. Memory device(s) 130 are accessible by machine learning engine 105 and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
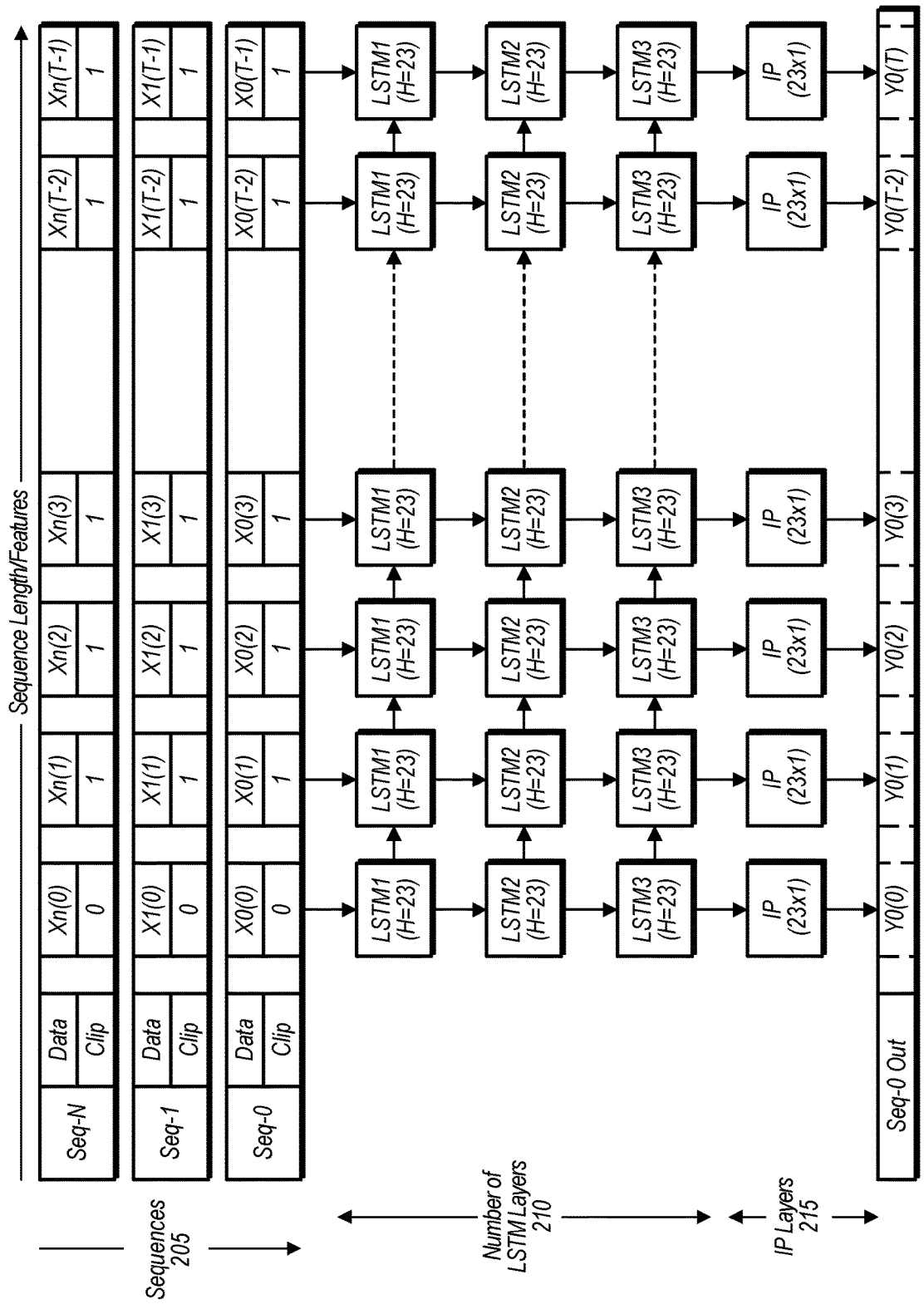
FIG. 2 is a block diagram of one implementation of long short-term memory (LSTM) layers of a machine learning engine.

Turning now to FIG. 2, a block diagram of one implementation of long short-term memory (LSTM) layers 210 of a machine learning engine is shown. In one implementation, the logic of LSTM layers 210 is included in each LSTM layer of machine learning engine 105 (of FIG. 1). The inputs to LSTM layers 210 are sequences 205, which includes any number N of sequences, with N a positive integer which varies from implementation to implementation. It is noted that sequences 205 can also be referred to herein as batches 205. LSTM layers 210 include H number of hidden cells or outputs per layer. Each sample input goes through all LSTM layers 210, and the processing of LSTM layers 210 is repeated for all samples within a sequence. LSTM layers 210 include any number of layers which receive the sequences 205 and pass the sequences 205 through to intrinsic plasticity (IP) layers 215. In other implementations, LSTM layers 210 include other components and/or are structured in other suitable manners.

Figure 3:
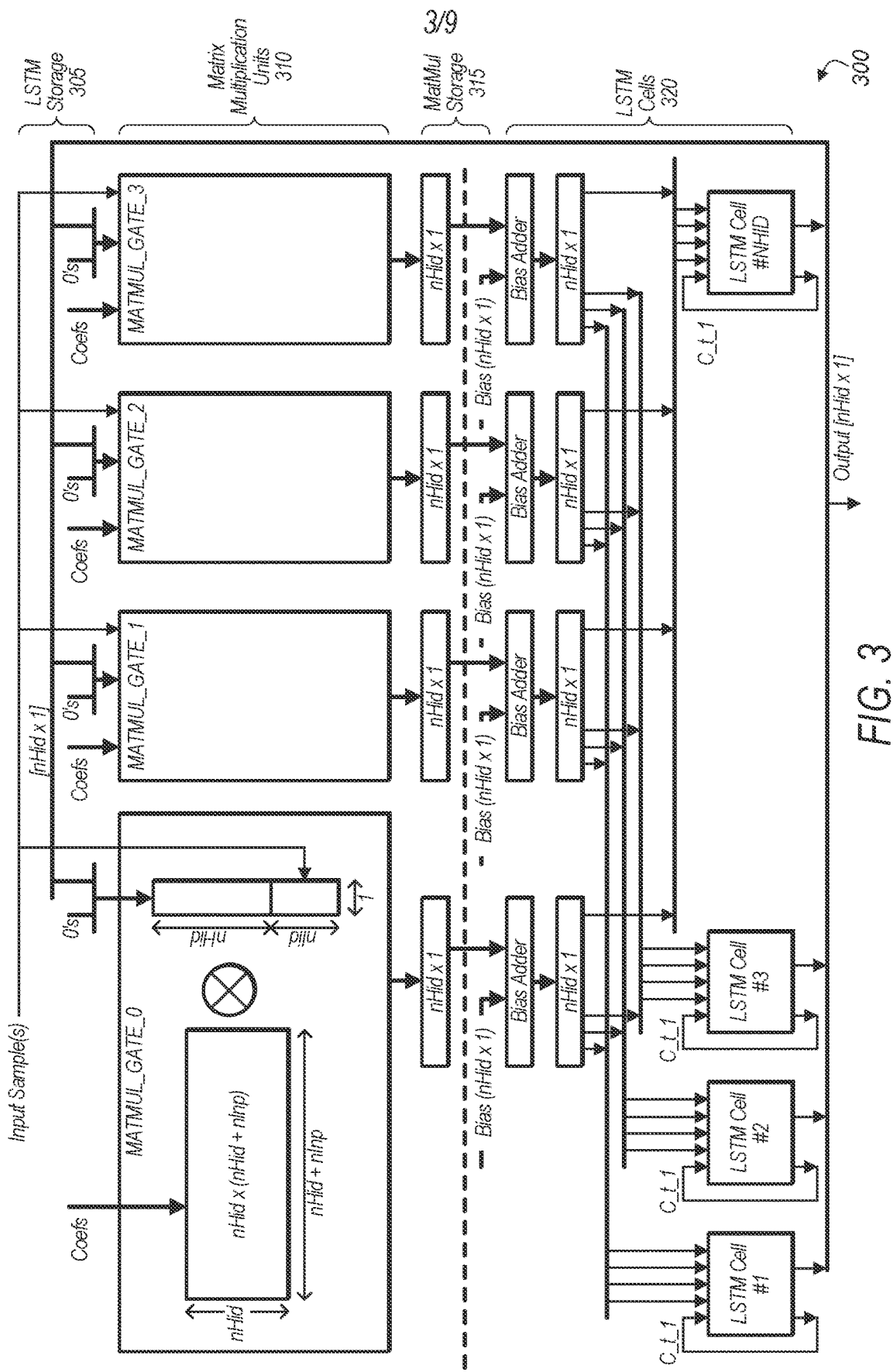
FIG. 3 is a block diagram of one implementation of a machine learning engine.

Referring now to FIG. 3, a block diagram of one implementation of a machine learning engine 300 is shown. Input samples from LSTM storage 305 are coupled to one set of inputs of matrix multiplication units 310. Also, coefficients are coupled to another set of inputs of matrix multiplication units 310. Within each matrix multiplication unit 310, the coefficients are stored in an N×M array and the input samples are stored in an M×1 array wherein N and M are positive integers greater than one, and wherein the values of N and M vary according to the implementation. Each matrix multiplication operation involves the coefficients being multiplied by the input samples. While four matrix multiplication units 310 are shown in FIG. 3, it should be understood that other implementations can have other numbers of matrix multiplication units. The outputs of matrix multiplication units 310 are coupled to matrix multiplication storage 315. Matrix multiplication storage 315 is implemented with any type of storage elements, with the type varying according to the implementation. The results of the matrix multiplication operations are coupled from matrix multiplication storage 315 to LSTM cells 320.

Figure 4:
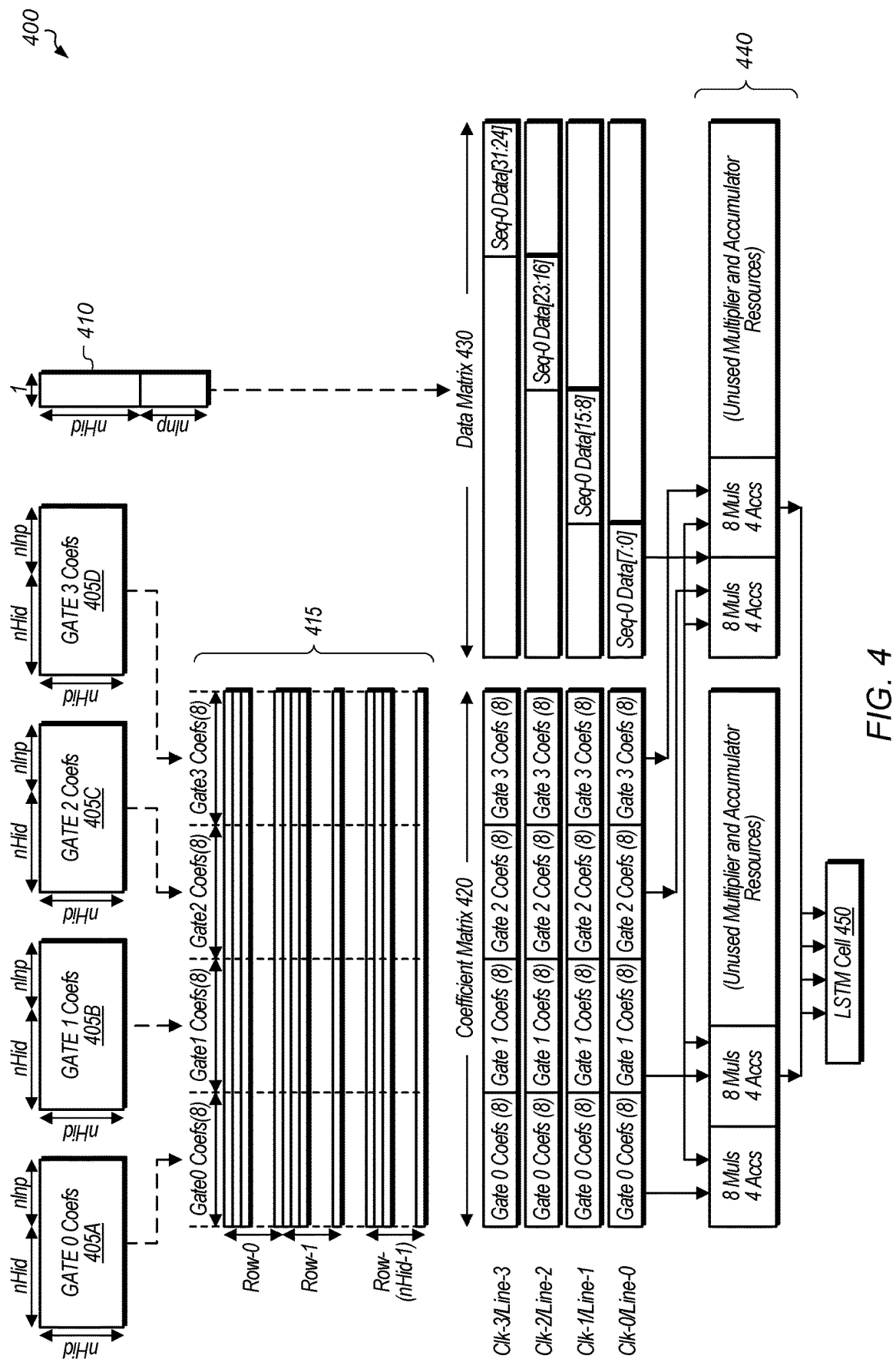
FIG. 4 is a block diagram of one implementation of a matrix multiplication pipeline in a machine learning engine.

Turning now to FIG. 4, a block diagram of one implementation of a matrix multiplication pipeline 400 in a machine learning engine is shown. Coefficients 405A-D are provided to the inputs of matrix multiplication pipeline 400. In one implementation, the coefficient read channel bandwidth from memory is 32 coefficients per clock. In other implementations, the coefficient read channel bandwidth from memory is other numbers of coefficients per clock. In one implementation, coefficients 405A-D are retrieved from memory and coupled through flop stages 415 to coefficient matrix 420. In one implementation, each of gates 0-3 includes eight coefficients. In other implementations, each of gates 0-3 includes other numbers of coefficients.

In parallel with coefficients 405A-D being retrieved from memory, sequence data 410 is coupled to data matrix 430. In one implementation, a maximum of 32 coefficients can be read and provided to flop stages 415 per clock cycle and a maximum of 32 samples can be read and provided to data matrix 430 per clock cycle. Coefficients are coupled from coefficient matrix 420 to multiplier and accumulator units 440 to be multiplied by sequence data coupled from data matrix 430. The outputs of multiplier and accumulator units 440 are coupled to LSTM cell 450. Since the coefficient matrix 420 is an N×M matrix and the sequence data is an M×1 matrix, the matrix multiplication is not able to be parallelized. Hence, a single set of eight samples of sequence data is multiplied by the coefficients in a single cycle by multiplier and accumulator units 440, resulting in an underutilization of resources.

Figure 5:
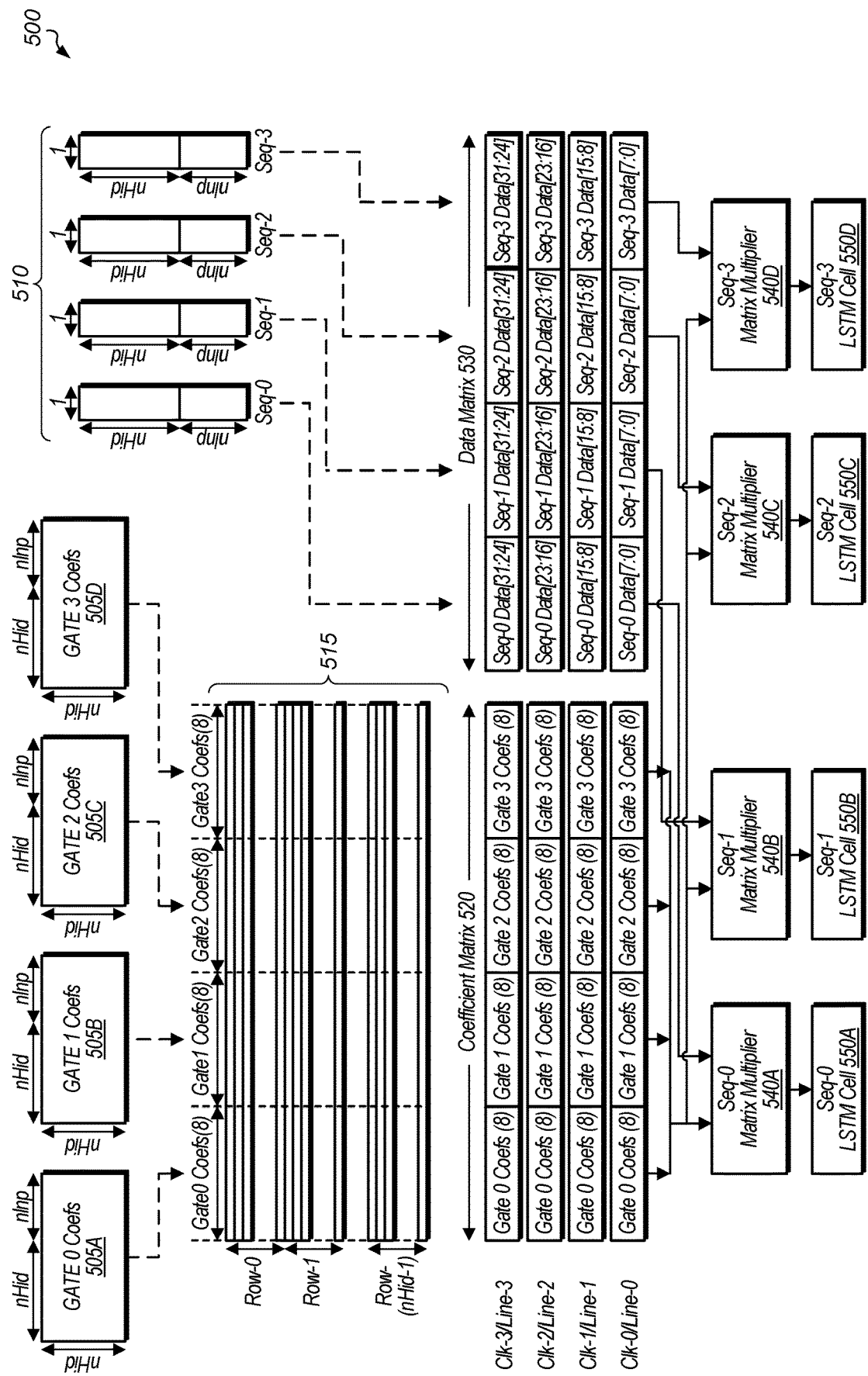
FIG. 5 is a block diagram of one implementation of a more efficient scheme for a matrix multiplication pipeline in a machine learning engine.

Referring now to FIG. 5, a block diagram of another implementation of a more efficient scheme for a matrix multiplication pipeline 500 in a machine learning engine is shown. Coefficients 505A-D of gates 0-3 are coupled from memory to flop stages 515 and then to coefficient matrix 520. Sequence data 510 for sequences 0-3 is interleaved together and provided to data matrix 530. As shown in data matrix 530, each row includes sequence 0 data followed by sequence 1 data, followed by sequence 2 data, and followed by sequence 3 data. The interleaved structure of sequence data in the rows of data matrix 530 allows matrix multipliers 540A-D to operate in parallel on a matrix multiplication operation between the coefficients in coefficient matrix 520 and the sequence data in data matrix 530. The outputs of matrix multipliers 540A-D are provided to LSTM cells 550A-D, respectively.

Matrix multiplication pipeline 500 allow for four times the throughput as compared to the matrix multiplication pipeline 400 (of FIG. 4). This improved throughput is obtained by interleaving the sequence data of four sequences together and then providing the interleaved sequence data to matrix multiplication pipeline 500. In other implementations, with other structures of matrix multiplication pipelines, other numbers (e.g., 8, 16) of sequences can be interleaved together to achieve other amounts of throughput gains.

Figure 6:
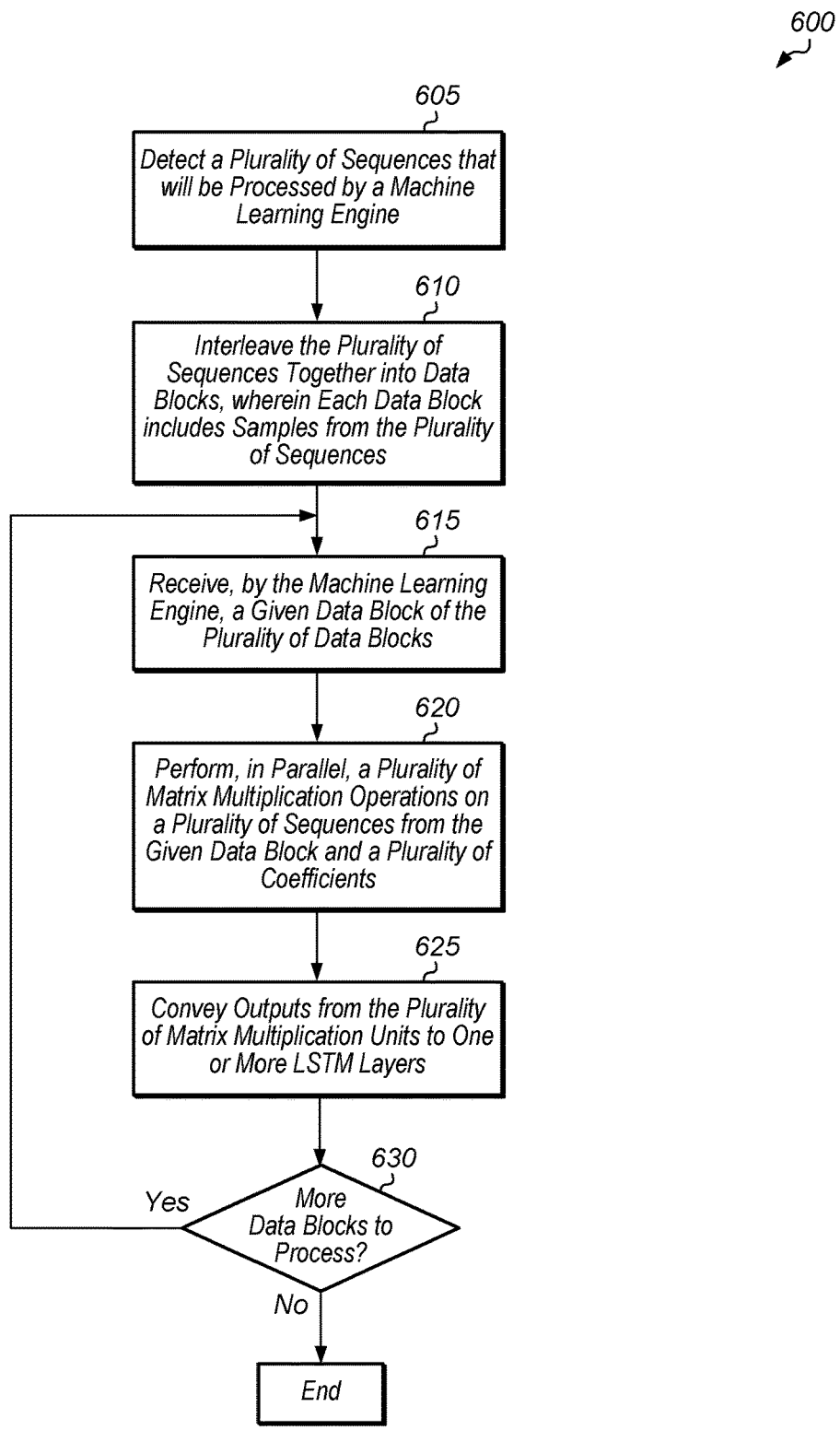
FIG. 6 is a generalized flow diagram illustrating one implementation of a method for implementing a machine learning model.
Figure 7:
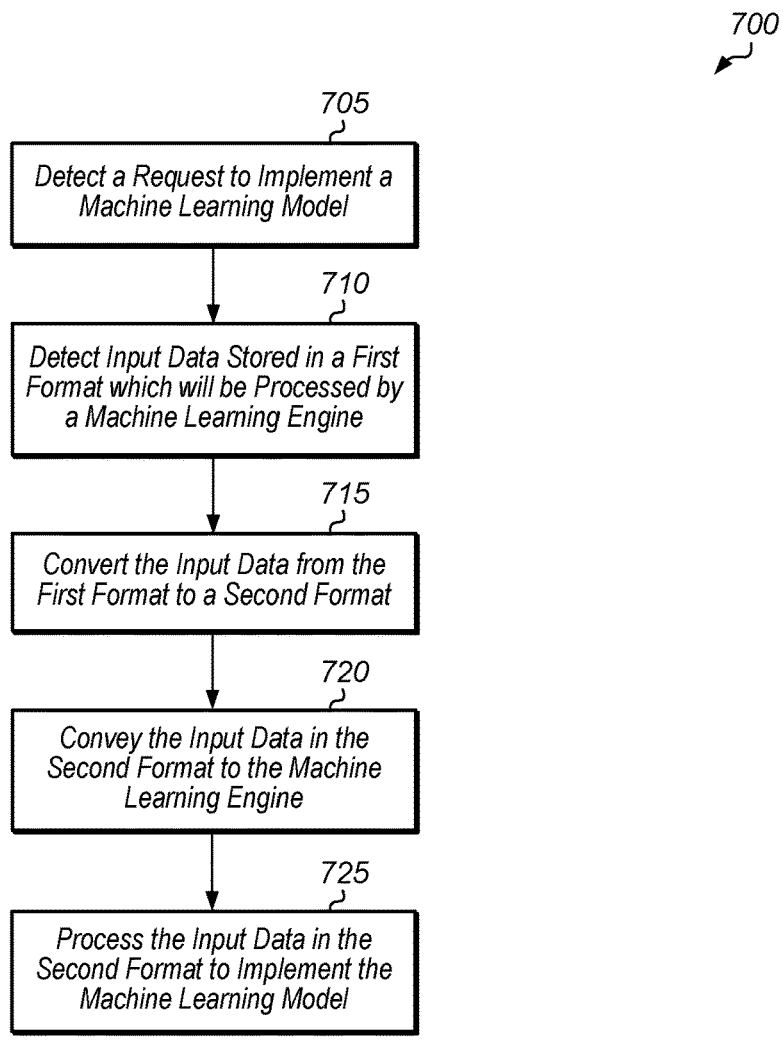
FIG. 7 is a generalized flow diagram illustrating another implementation of a method for converting the format of input data for processing by a machine learning engine.
Figure 8:
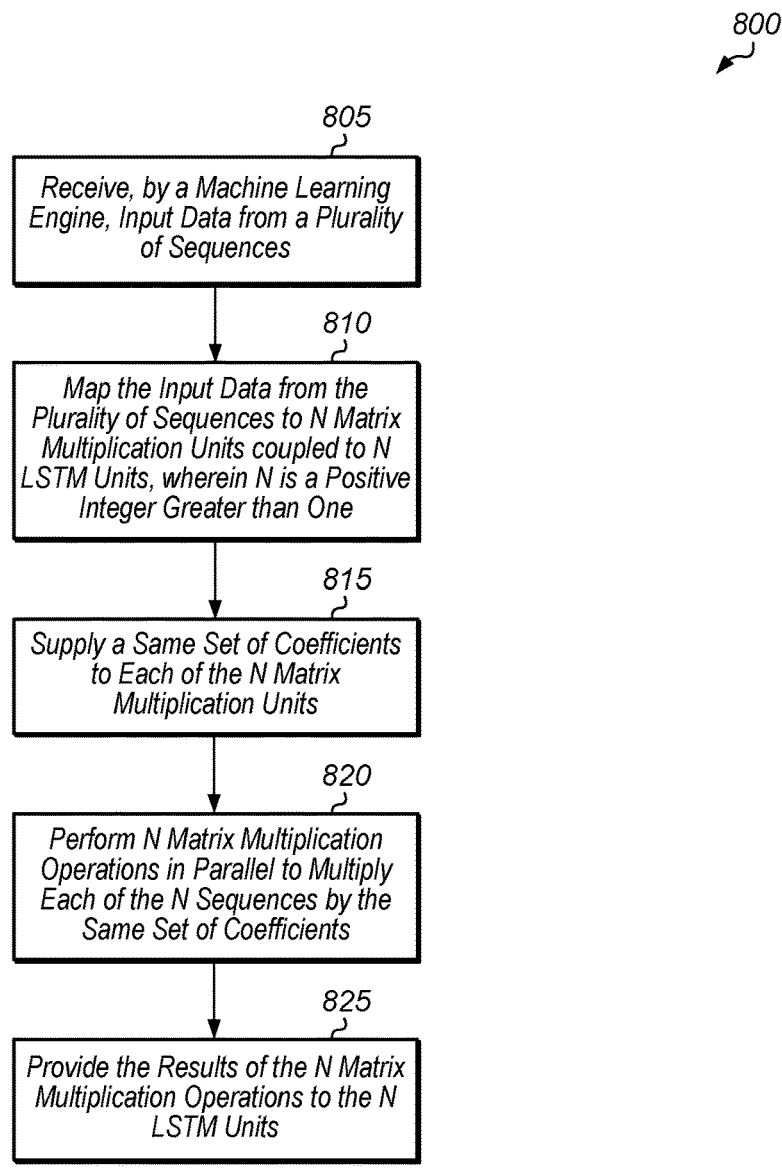
FIG. 8 is a generalized flow diagram illustrating one implementation of a method for processing multiple sequences or batches in parallel on a machine learning engine.

Turning now to FIG. 6, one implementation of a method 600 for implementing a machine learning model is shown. For purposes of discussion, the steps in this implementation and those of FIG. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A processing unit detects a plurality of sequences that will be processed by a machine learning engine (block 605). In response to detecting the plurality of sequences that will be processed by the machine learning engine, the processing unit interleaves the plurality of sequences together into data blocks, wherein each data block includes samples from the plurality of sequences (block 610). Next, the machine learning engine receives a given data block of the plurality of data blocks (block 615). In one implementation, the machine learning engine retrieves the given data block from memory. In another implementation, the processing unit conveys the given data block to the machine learning engine. In a further implementation, the given data block is supplied to the machine learning engine via a processing pipeline.

Then, the machine learning engine performs, in parallel, a plurality of matrix multiplication operations on a plurality of sequences from the given data block and a plurality of coefficients (block 620). Next, the machine learning engine conveys outputs from the plurality of matrix multiplication units to the one or more LSTM layers (block 625). If there are more data blocks to process (conditional block 630, "yes" leg), then method 600 returns to block 615. It is noted that the machine learning engine is able to process subsequent data blocks in back-to-back clock cycles. In other words, in one implementation, the data blocks are processed by the machine learning engine in a pipelined fashion. Otherwise, if there are no more data blocks to process (conditional block 630, "no" leg), then method 600 ends.

Referring now to FIG. 7, one implementation of a method 700 for converting the format of input data for processing by a machine learning engine is shown. A processing unit detects a request to implement a machine learning model (block 705). Next, the processing unit detects input data which will be processed by a machine learning engine stored in a first format in memory (block 710). Then, the processing unit converts the input data from the first format to a second format (block 715). In one implementation, the processing unit rearranges the ordering of the input data. For example, in one implementation, the second format is an interleaved format with different sequences of input data interleaved together. For example, a set of samples from a first sequence are stored next to a set of samples from a second sequence, followed by a set of samples from a third sequence, and so on. Any number of sequences are interleaved together, with the number varying according to the implementation.

Next, the processing unit conveys the input data in the second format to the machine learning engine (block 720). In one implementation, the processing unit stores the input data in the memory after converting the input data to the second format. The input data is then conveyed from the memory to the machine learning engine. In another implementation, rather than storing the input data back into memory in the second format, the processing unit converts the input data to the second format in an inline fashion and then provides the input data in the second format to the machine learning engine. After block 720, the machine learning engine processes the input data in the second format to implement a machine learning model (block 725). After block 725, method 700 ends. By processing the input data in the second format, the machine learning engine is able to execute the model more quickly and more efficiently (i.e., with lower power consumption) than if the input data were processed in the first format.

Turning now to FIG. 8, one implementation of a method 800 for processing multiple sequences in parallel on a machine learning engine is shown. A machine learning engine receives input data from a plurality of sequences (block 805). The machine learning engine maps the input data from the plurality of sequences to N matrix multiplication units coupled to N LSTM units, wherein N is a positive integer greater than one (block 810). Also, the machine learning engine supplies a same set of coefficients to each of the N matrix multiplication units (block 815). Next, N matrix multiplication operations are performed in parallel to multiply each of the N sequences by the same set of coefficients (block 820). Then, the results of the N matrix multiplication operations are provided to the N LSTM units (block 825). After block 825, method 800 ends. It is noted that method 800 can be repeated for each new batch of input data that is received by the machine learning engine.

Figure 9:
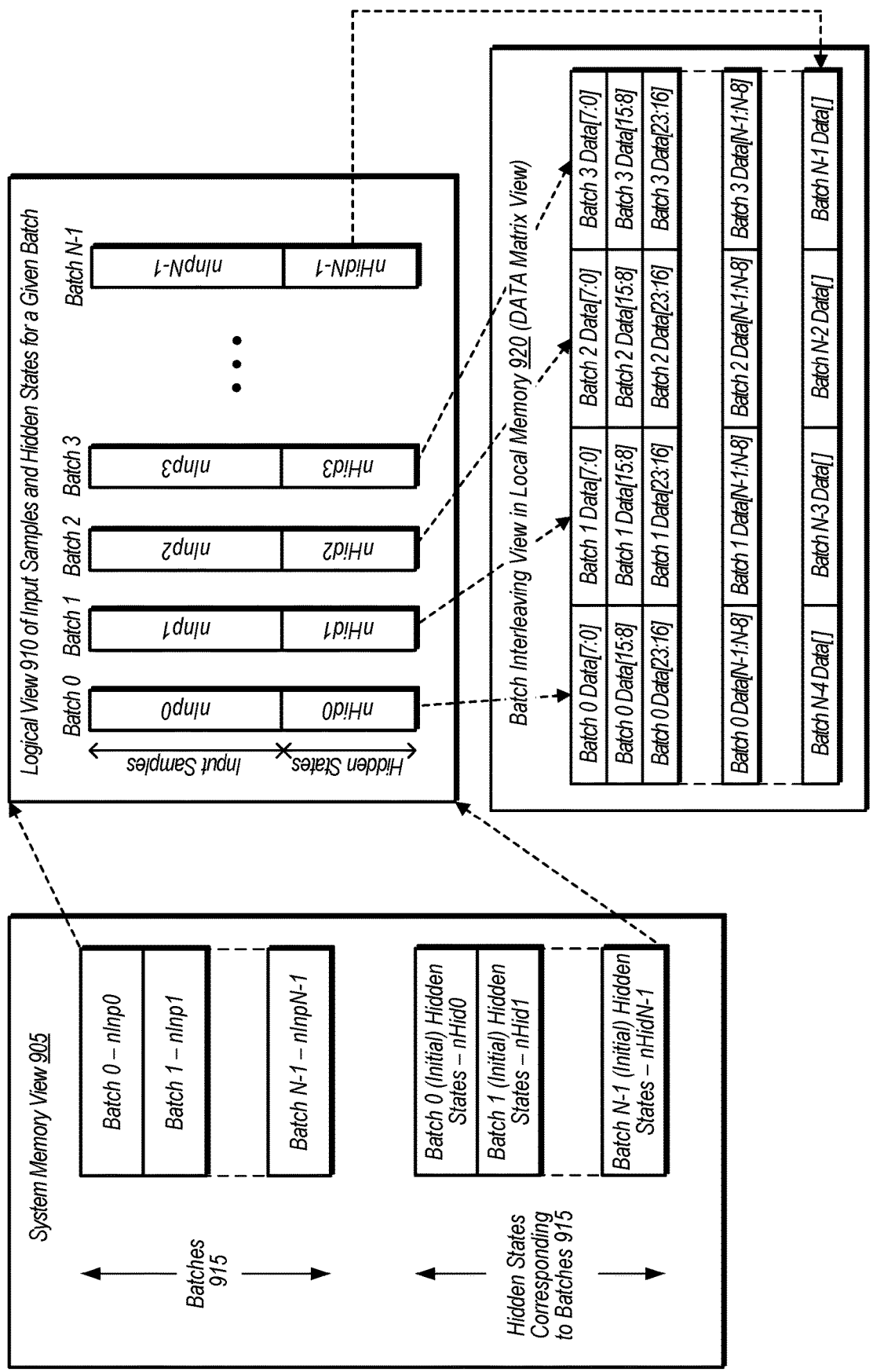
FIG. 9 is a block diagram of one implementation of LSTM batches in different stages.

Referring now to FIG. 9, a block diagram of one implementation of LSTM batches in different stages is shown. System memory view 905 is shown on the left-side of FIG. 9 with batches 915 and hidden states corresponding to batches 915. There are N different batches 915, with the value of N varying according to the implementation. Logical view 910 of input samples and hidden states for a given set of N batches are shown on the right-side of FIG. 9. It is noted that "input samples" can also be referred to herein as "input features". Each batch includes a group of input samples and corresponding hidden states. The batches are interleaved and stored in local memory 920 as shown on the bottom-right of FIG. 9. For example, eight samples of batch 0 are stored next to eight samples of batch 1 which are next to eight samples of batch 2 followed by eight samples of batch 3. This interleaving arrangement continues for the other rows of local memory 920 for the remainder of the N batches. The samples and hidden states are then processed by a machine learning engine based on the interleaved pattern shown in local memory 920.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a processing unit; and
   a machine learning engine comprising a plurality of matrix multiplication units and one or more long short-term memory (LSTM) layers;
   wherein the processing unit comprises circuitry configured to:
      detect two or more sequences, stored in a memory device, that will be processed by the machine learning engine;
      interleave the two or more sequences together into one or more data blocks, such that each data block comprises samples from each of the two or more sequences; and
      provide the one or more data blocks to the machine learning engine;
   wherein the machine learning engine comprises circuitry configured to:
      receive a given data block of the one or more data blocks;
      perform, in parallel by circuitry of the matrix multiplication units, a plurality of matrix multiplication operations on a plurality of sequences from the given data block and a plurality of coefficients to generate outputs; and
      convey the outputs from the plurality of matrix multiplication units to the one or more LSTM layers.

2. The system as recited in claim 1, wherein each sequence comprises a plurality of samples.

3. The system as recited in claim 1, wherein the plurality of coefficients are stored in an N×(N+M) matrix, wherein N and M are positive integers greater than one.

4. The system as recited in claim 3, wherein the given data block is stored in an N-sample array.

5. The system as recited in claim 4, wherein N is scalable based on a local memory bus width, a number of multiplier-accumulator units, and an availability of LSTM cells.

6. The system as recited in claim 1, wherein the plurality of matrix multiplication operations comprise a same set of N coefficients being multiplied by different sequences of the plurality of sequences, wherein N is a positive integer greater than one.

7. The system as recited in claim 6, wherein the machine learning engine implements a recurrent neural network.

8. A method comprising:
   detecting, by a processing unit comprising circuitry, two or more sequences, stored in a memory device, that will be processed by a machine learning engine;
   interleaving, by the processing unit, the two or more sequences together into one or more data blocks, such that each data block comprises samples from the two or more sequences;
   providing the one or more data blocks to the machine learning engine;
   receiving, by the machine learning engine, a given data block of the one or more data blocks;
   performing, by circuitry of a plurality of matrix multiplication units of the machine learning engine, a plurality of matrix multiplication operations in parallel on a plurality of sequences from the given data block and a plurality of coefficients to generate outputs; and
   conveying, by the machine learning engine, the outputs from the plurality of matrix multiplication units to one or more long short-term memory (LSTM) layers.

9. The method as recited in claim 8, wherein each sequence comprises a plurality of samples.

10. The method as recited in claim 8, wherein the plurality of coefficients are stored in an N×(N+M) matrix, wherein N and M are positive integers greater than one.

11. The method as recited in claim 10, wherein the given data block is stored in an N-sample array.

12. The method as recited in claim 11, wherein N is scalable based on a local memory bus width, a number of multiplier-accumulator units, and an availability of LSTM cells.

13. The method as recited in claim 8, wherein the plurality of matrix multiplication operations comprise a same set of N coefficients being multiplied by different sequences of the plurality of sequences, wherein N is a positive integer greater than one.

14. The method as recited in claim 13, wherein the machine learning engine implements a recurrent neural network.

15. An apparatus comprising:
   a machine learning engine comprising circuitry of a plurality of matrix multiplication units; and
   a memory device coupled to the machine learning engine;
   wherein the machine learning engine comprises circuitry configured to:

receive a given data block comprising a plurality of sequences interleaved together;

perform, in parallel by circuitry of the matrix multiplication units, a plurality of matrix multiplication operations on the plurality of sequences from the given data block and a plurality of coefficients to generate outputs; and convey the outputs from the plurality of matrix multiplication units to one or more long short-term memory (LSTM) layers.

16. The apparatus as recited in claim 15, wherein each sequence comprises a plurality of samples.

17. The apparatus as recited in claim 15, wherein the plurality of coefficients are stored in an N×(N+M) matrix, wherein N and M are positive integers greater than one.

18. The apparatus as recited in claim 17, wherein the given data block is stored in an N-sample array.

19. The apparatus as recited in claim 18, wherein N is scalable based on a local memory bus width, a number of multiplier-accumulator units, and an availability of LSTM cells.

20. The apparatus as recited in claim 15, wherein the plurality of matrix multiplication operations comprise a same set of N coefficients being multiplied by different sequences of the plurality of sequences, wherein N is a positive integer greater than one.

\* \* \* \* \*